United States Patent
Tamura (10) Patent No.: US 7,997,095 B2
(45) Date of Patent: Aug. 16, 2011

(54) METHOD OF CONTROLLING AIR CONDITIONER COOLING LOAD UTILIZING CONTROLLING THE OPENING DEGREE OF AN EXPANSION VALVE AND/OR THE NUMBER OF ROTATIONS OF AN OUTDOOR FAN

(75) Inventor: Hideya Tamura, Kanagawa (JP)

(73) Assignee: Fujitsu General Limited, Kawasaki-shi (JP)

( * ) Notice: Subject to any disclaimer, the term of this patent is extended or adjusted under 35 U.S.C. 154(b) by 645 days.

(21) Appl. No.: 11/878,430

(22) Filed: Jul. 24, 2007

(65) Prior Publication Data

US 2008/0023563 A1 Jan. 31, 2008

(30) Foreign Application Priority Data

Jul. 24, 2006 (JP) .............................. P. 2006-200354

(51) Int. Cl.
*F25B 17/00* (2006.01)
*F25B 39/04* (2006.01)
*F25B 41/04* (2006.01)
(52) U.S. Cl. .............................. 62/181; 62/183; 62/222
(58) Field of Classification Search .................... 62/223, 62/181, 180, 183, 222
See application file for complete search history.

(56) References Cited

U.S. PATENT DOCUMENTS

| | | | | |
|---|---|---|---|---|
| 5,138,844 A | * | 8/1992 | Clanin et al. | 62/89 |
| 5,257,508 A | * | 11/1993 | Powell et al. | 62/180 |
| 5,568,732 A | * | 10/1996 | Isshiki et al. | 62/129 |
| 5,579,648 A | * | 12/1996 | Hanson et al. | 62/126 |
| 6,560,980 B2 | * | 5/2003 | Gustafson et al. | 62/186 |
| 2004/0144111 A1 | | 7/2004 | Matsuoka | |

FOREIGN PATENT DOCUMENTS

| | | |
|---|---|---|
| DE | 3248356 A1 | 7/1983 |
| JP | 07-158980 | 6/1995 |
| KR | 2005 0037259 A | 4/2005 |
| WO | WO-03/083376 A1 | 10/2003 |

* cited by examiner

*Primary Examiner* — Marc E Norman
(74) *Attorney, Agent, or Firm* — Venable LLP; Michael A. Sartori; Steven J. Schwarz (57) ABSTRACT

A method of controlling an air conditioner includes a step of controlling an opening degree of the expansion valve and/or the number of rotations of an outdoor fan of the outdoor heat exchanger such that the difference Tx (=Te−Ti) between the temperature Te of the outdoor heat exchanger and the temperature Ti of the indoor heat exchanger is within a predetermined range, in a cooling mode in a low outside air temperature environment. Specifically, the opening degree of the expansion valve is adjusted, with the number of rotations of the outdoor fan being reduced to be smaller than that in a normal cooling mode, and then, the number of rotations of the outdoor fan is adjusted with the opening degree of the expansion valve being fixed, thereby controlling the difference Tx to be substantially constant.

7 Claims, 6 Drawing Sheets

METHOD OF CONTROLLING AIR CONDITIONER COOLING LOAD UTILIZING CONTROLLING THE OPENING DEGREE OF AN EXPANSION VALVE AND/OR THE NUMBER OF ROTATIONS OF AN OUTDOOR FAN

BACKGROUND OF THE INVENTION

The present invention relates to a method of controlling an air conditioner, and more particularly, to a method of controlling a cooling operation of an air conditioner in a low outside air temperature environment.

In general, air conditioners have a refrigerating cycle including a compressor, a four-way valve, an outdoor heat exchanger, an expansion valve, and an indoor heat exchanger. In the winter in which the outside air temperature is low, generally, the air conditioner performs a heating operation to circulate a high-pressure and high-temperature refrigerant gas discharged from the compressor in the order of the four-way valve, the indoor heat exchanger, the expansion valve, the outdoor heat exchanger, the four-way valve, and the compressor, thereby using the indoor heat exchanger and the outdoor heat exchanger as a condenser and an evaporator, respectively.

On the other hand, in the summer in which the outside air temperature is high, generally, the air conditioner performs a cooling operation to circulate a high-pressure and high-temperature refrigerant gas discharged from the compressor in the order of the four-way valve, the outdoor heat exchanger, the expansion valve, the indoor heat exchanger, the four-way valve, and the compressor, thereby using the outdoor heat exchanger and the indoor heat exchanger as the condenser and the evaporator, respectively. In addition to this type of air conditioner, air conditioners having a dehumidifying function or a reheating and dehumidifying function are put on the market.

In recent years, particularly, a lot of heat sources, such as illuminators or electronic apparatuses, have been provided in the room, such as an office. Therefore, in many cases, the air conditioner is operated in a cooling mode even in a low outside air temperature environment in which the outside air temperature is equal to or smaller than, for example, 10° C.

In the cooling operation performed in the low outside air temperature environment, assuming that an indoor load is constant, when the outside air temperature falls, the refrigerant in the outdoor heat exchanger is excessively supercooled, and a refrigerant flows into the outdoor heat exchanger as a liquid refrigerant, which results in a reduction in the amount of refrigerant circulated. Therefore, it is necessary to open the expansion valve (in many cases, an electronic expansion valve).

In a case in which the outside air temperature falls to be lower than the freezing point, even when the expansion valve is fully opened, only a gas refrigerant is circulated, and the indoor heat exchanger is superheated, which makes it difficult to obtain desired cooling capability. In addition, the temperature around an inlet of the indoor heat exchanger is lower than the freezing point, and the inlet is frozen.

In order to solve this problem, it is necessary to reduce the number of rotations of the outdoor fan to prevent supercooling of the outdoor heat exchanger, and circulate the liquid refrigerant through the indoor heat exchanger. That is, in the cooling mode in the low outside air temperature environment, it is necessary to control the expansion value to be opened larger than that in a normal cooling mode, and control the outdoor fan to rotate at a lower rotational speed than that in the normal cooling mode.

In a method of controlling a cooling operation in the low outside air temperature environment according to the related art, for a predetermined number of rotations of the compressor determined by an indoor unit, when the outside air temperature falls, the number of rotations of the outdoor fan is reduced. Therefore, a target discharge temperature of the compressor is calculated using the outside air temperature, the temperature of the indoor heat exchanger, the number of rotations of the compressor, and the predetermined degree of superheat as variables. Then, the opening degree of the expansion valve is adjusted, on the basis of the difference between the calculated value and a detected discharge temperature, to control the amount of refrigerant circulated, thereby preventing the excessive superheating of the indoor heat exchanger (a discharge temperature control method).

Patent Document 1 discloses the following configuration: in a cooling mode in a low outside air temperature environment, in order to prevent the indoor heat exchanger from being frozen and to widen a cooling operation range, a set temperature is compared with the outside air temperature; and on the basis of the result of the comparison, when the operating frequency of the compressor is higher than a predetermined value, the expansion value is opened, but when the operating frequency of the compressor is lower than the predetermined value, the expansion value is closed.

Further, Patent Document 2 discloses a structure including: a first pressure difference adjusting apparatus that, in a cooling mode in an environment in which the outside air temperature is lower than a predetermined value, when the difference between the high pressure and the low pressure of a compressor is lower than a predetermined value, reduces the number of rotations of an outdoor fan to prevent the difference between the high pressure and the low pressure of the compressor from being reduced; and a second pressure difference adjusting apparatus that increases the operating frequency of the compressor when it is difficult to maintain the difference between the high pressure and the low pressure to be larger than a predetermined value by using only the first pressure difference adjusting apparatus.

[Patent Document 1]
Unexamined Japanese Patent Application Publication No. Hei7-158980
[Patent Document 2]
International Application Publication No. WO2003/083376

However, in the discharge temperature control method according to the related art, the same control method is used for a normal cooling mode (at the room temperature) and a cooling mode in a low outside air temperature environment. Therefore, when the outside air temperature falls, it is difficult to control the amount of refrigerant circulated due to the following factors.

(1) The number of rotations of the outdoor fan is reduced to increase a condensation temperature. Therefore, the detection of the outside air temperature is greatly affected by the temperature of the outdoor heat exchanger. (2) As the outside air temperature falls, the discharge temperature falls. Therefore, there is little variation in the amount of refrigerant circulated through the refrigerating cycle that is suitable when the above-mentioned variables vary and a target discharge temperature when these variables do not vary. (3) Since the amount of refrigerant circulated through the refrigerating cycle is reduced, the response of a discharge temperature detection value to a change in the variables is slow. (4) When an inlet of the indoor heat exchanger is superheated, a unit for detecting the superheating of the inlet is not provided.

When the above-mentioned factors (1) to (3) are combined with each other, outside air temperature that is higher than the actual outside air temperature is detected, so that a higher discharge temperature than a discharge temperature at which the optimum amount of refrigerant circulated is obtained is calculated. As a result, the expansion valve is closed to increase the discharge temperature up to a target value. Since the difference between the discharge temperature and the ordinary temperature is small, the expansion valve is narrowed. As a result, the amount of refrigerant to be circulated is considerably reduced.

As the detecting unit described in (4), generally, a temperature sensor is provided in the indoor heat exchanger to detect the temperature of the center of a pipeline passing through the indoor heat exchanger. Therefore, in order to detect the superheating of an inlet of the indoor heat exchanger, an additional temperature sensor needs to be provided in the vicinity of the inlet of the indoor heat exchanger.

In order to solve the above-mentioned problems, it is necessary to change the outside air temperature detecting method, improve a method of detecting and controlling the discharge temperature, and additionally provide a temperature sensor for monitoring the temperature of the inlet of the indoor heat exchanger. Therefore, the specifications and the design of the air conditioner according to the related art should be significantly changed.

An object of the invention is to provide a method of appropriately controlling the amount of refrigerant circulated in a cooling mode in a low outside air temperature environment without significantly changing the specifications and the design of the existing air conditioner.

SUMMARY OF THE INVENTION

In order to achieve the above-mentioned object, according to an aspect of the invention, there is provided a method of controlling an air conditioner having a refrigerating cycle including a compressor, an outdoor heat exchanger, an expansion value, and an indoor heat exchanger, the method includes:

a step of controlling an opening degree of the expansion valve and/or the number of rotations of an outdoor fan of the outdoor heat exchanger such that the difference Tx (=Te−Ti) between the temperature Te of the outdoor heat exchanger and the temperature Ti of the indoor heat exchanger is within a predetermined range, in a cooling mode in a low outside air temperature environment.

In the method of controlling an air conditioner according to the above-mentioned aspect, preferably, the temperature Te of the outdoor heat exchanger is the temperature of an outlet of the outdoor heat exchanger, and the temperature Ti of the indoor heat exchanger is detected at the center of a pipeline passing through the indoor heat exchanger.

In the method of controlling an air conditioner according to the above-mentioned aspect, preferably, when the difference Tx is larger than an upper limit value of the predetermined range, the opening degree of the expansion value is reduced and/or the number of rotations of the outdoor fan is increased such that the difference Tx is within the predetermined range.

In the method of controlling an air conditioner according to the above-mentioned aspect, preferably, when the difference Tx is smaller than a lower limit value of the predetermined range, the opening degree of the expansion value is increased and/or the number of rotations of the outdoor fan is decreased such that the difference Tx is within the predetermined range.

In the method of controlling an air conditioner according to the above-mentioned aspect, preferably, an expansion valve control mode for controlling the opening degree of the expansion valve is performed prior to a mode for controlling the number of rotations of the outdoor fan, in order to set the difference Tx within the predetermine range.

In the method of controlling an air conditioner according to the above-mentioned aspect, preferably, in the expansion valve control mode, the number of rotations of the outdoor fan is set to be smaller than that of the outdoor fan in a normal cooling mood.

In the method of controlling an air conditioner according to the above-mentioned aspect, preferably, when the difference Tx is beyond the predetermined range, the expansion valve control mode is switched to the mode for controlling the number of rotations of the outdoor fan to decrease the number of rotations of the outdoor fan to a predetermined number of rotations.

In the method of controlling an air conditioner according to the above-mentioned aspect, preferably, the opening degree of the expansion value and/or the number of rotations of the outdoor fan vary according to an outside air temperature.

According to the invention, it is possible to rapidly control the amount of refrigerant circulated by controlling the opening degree of the expansion valve and/or the number of rotations of the outdoor fan of the outdoor heat exchanger such that the difference Tx (=Te−Ti) between the temperature Te of the outdoor heat exchanger and the temperature Ti of the indoor heat exchanger is within a predetermined range, in a cooling mode in a low outside air temperature environment. In addition, since the temperatures Te and Ti are the temperatures of a liquid refrigerant, they have high responsibility.

Further, when the indoor heat exchanger is superheated, Te is smaller than Ti and Tx is smaller than 0. Therefore, it is possible to detect the superheating of the indoor heat exchanger without providing a temperature sensor in the vicinity of the inlet of the indoor heat exchanger.

DETAILED DESCRIPTION OF THE PREFERRED EMBODIMENTS

Hereinafter, exemplary embodiments of the invention will be described with reference to the accompanying drawings, but the invention is not limited thereto.

Figure 1:
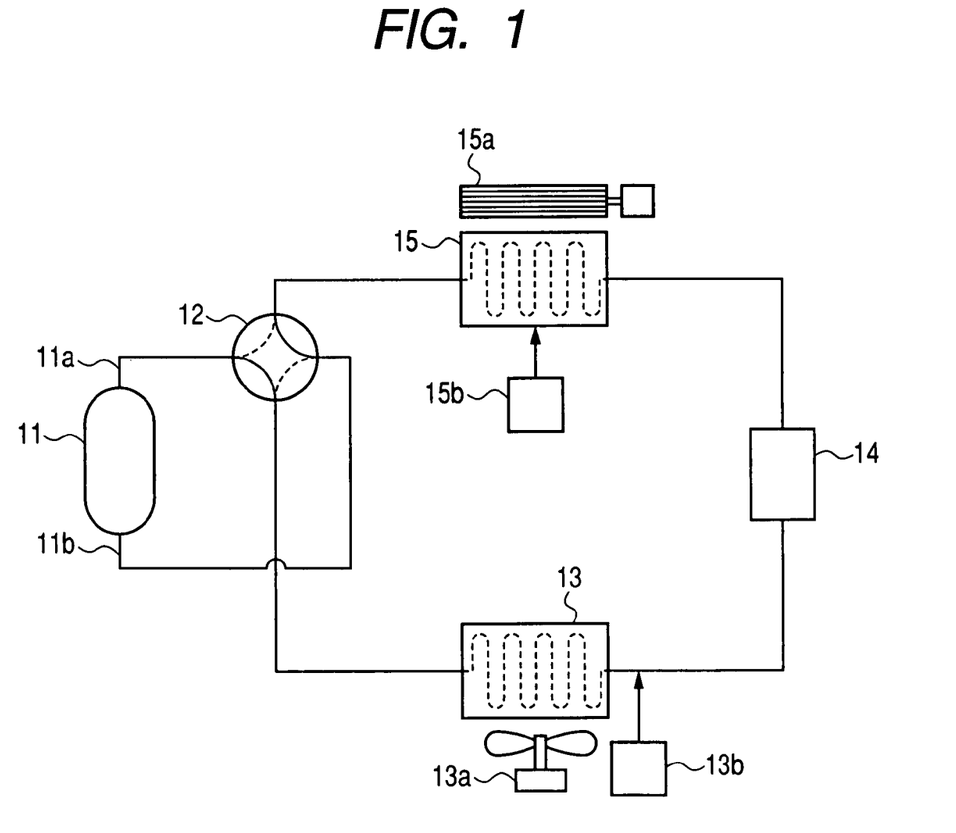
FIG. 1 is a diagram illustrating a refrigerating cycle of an air conditioner according to an embodiment of the invention.

FIG. 1 shows a refrigerating cycle of an air conditioner according to an embodiment of the invention. The refrigerating cycle may be a general refrigerating cycle applied to general air conditioners. As a basic structure, the refrigerating cycle includes a compressor 11, a four-way valve, an outdoor heat exchanger 13, an expansion valve 14, and an indoor heat exchanger 15. In this embodiment, the expansion value 14 is an electronic expansion valve whose opening degree is controlled by a pulse motor (not shown).

In a cooling mode, the four-way valve is switched, as represented by a solid line in FIG. 1, such that the outdoor heat exchanger 13 is connected to a refrigerant discharge side 11a of the compressor 11 and the indoor heat exchanger 15 is connected to a refrigerant inflow side 11b of the compressor 11. Therefore, the outdoor heat exchanger 13 serves as a condenser, and the indoor heat exchanger 15 serves as an evaporator.

In addition, in a heating mode, the four-way valve 12 is switched, as represented by a chain line, such that the indoor heat exchanger 15 is connected to the refrigerant discharge side 11a of the compressor 11 and the outdoor heat exchanger 13 is connected to the refrigerant inflow side 11b of the compressor 11. Therefore, the outdoor heat exchanger 13 serves as an evaporator, and the indoor heat exchanger 15 serves as a condenser. Since the invention relates to a cooling operation in a low outside air temperature environment, the refrigerating cycle may be used for the cooling operation.

The outdoor heat exchanger 13a is provided with an outdoor fan 13a, and the indoor heat exchanger 15 is provided with an indoor fan 15a. In general, a propeller fan is used as the outdoor fan 13a, and a crossflow fan is used as the indoor fan 15a.

Temperature sensors 13b and 15b are provided in the outdoor heat exchanger 13 and the indoor heat exchanger 15, respectively. The temperature sensor 13b of the outdoor heat exchanger 13 detects the temperature of the refrigerant discharged from an outlet of the outdoor heat exchanger 13, and the temperature sensor 15b of the indoor heat exchanger 15 detects the temperature of the refrigerant at the center of a pipe passing through the indoor heat exchanger 15.

Figure 2:
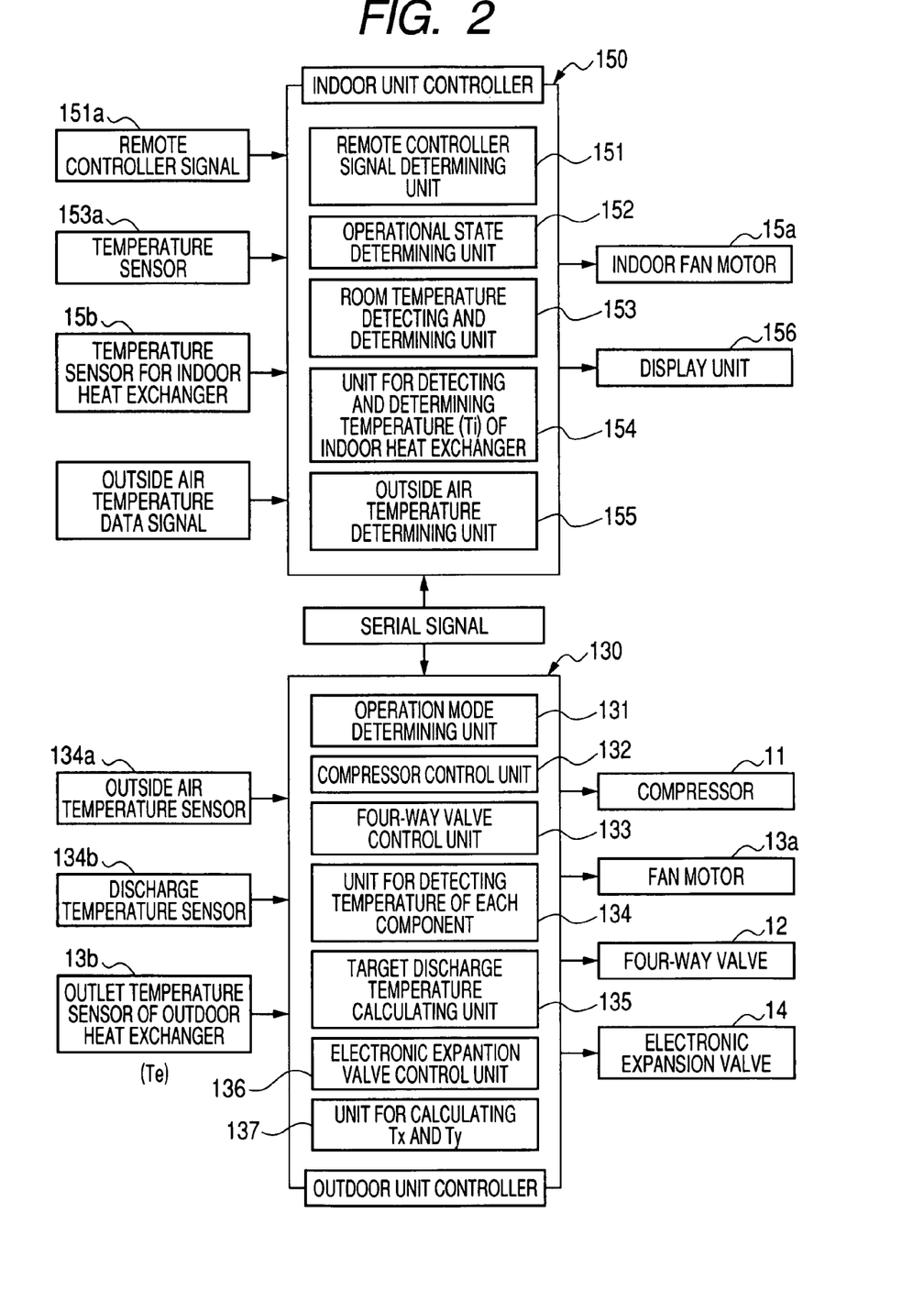
FIG. 2 is a block diagram illustrating a control system of the air conditioner.

FIG. 2 shows a control system of the air conditioner. The control system includes an indoor unit controller 150 and an outdoor unit controller 130. The indoor unit controller 150 and the outdoor controller 130 are connected to each other through data transmission lines such that they can communicate with each other.

The indoor unit controller 150 includes a remote controller signal determining unit 151, an operational state determining unit 152, a room temperature detecting and determining unit 153, a unit 154 for detecting and determining the temperature Ti of the indoor heat exchanger, and an outside air temperature determining unit 155.

The indoor unit controller 150 receives signals from a remote controller 151a, a room temperature sensor 153a, the temperature sensor 15b of the indoor heat exchanger 15, and an outside air temperature sensor 134a of an outdoor unit, which will be described later, and determines an operational state to control the number of rotations of the indoor fan 15a. In addition, the indoor unit controller 150 displays, for example, the operational state, a room temperature, and a set temperature on a display unit 156 of the indoor unit.

The outdoor unit controller 130 includes an operation mode determining unit 131, a compressor control unit 132, a four-way valve control unit 133, a unit 134 for detecting the temperature of each component, a target discharge temperature calculating unit 135, an electronic expansion valve control unit 136, and a unit 137 for calculating Tx and Ty. Tx and Ty will be described later.

The outdoor unit controller 130 controls the compressor 11, the outdoor fan 13a, the four-way valve 12, and the electronic expansion valve 14 on the basis of signals received from the outside air temperature sensor 134a, a discharge temperature sensor 134b, and the temperature sensor 13b of the outdoor heat exchanger 13, and control signals received from the indoor unit controller 150.

In this embodiment of the invention, the amount of refrigerant circulated in the cooling mode in a low outside air temperature environment is controlled by $Tx$ ($=Te-Ti$), which is the difference between a temperature (the temperature of the outlet) $Te$ that is detected by the temperature sensor 13b of the outdoor heat exchanger 13 and a temperature (the temperature of the center; an intermediate temperature) $Ti$ that is detected by the temperature sensor 15b of the outdoor heat exchanger 15 (hereinafter, this control method is referred to as a 'Tx control method').

In the Tx control method, a predetermined target value $Txt$ is set beforehand, and the opening degree of the electronic expansion valve 14 and/or the number of rotations of the outdoor fan 13a are controlled such that the difference $Ty$ between $Tx$ and $Txt$ ($=Tx-Txt$) is approximately zero, preferably, $Ty=0$.

Since both the temperature $Te$ of the outlet of the outdoor heat exchanger 13 and the intermediate temperature $Ti$ of the indoor heat exchanger 15 are the temperature of the liquid refrigerant, these temperatures $Te$ and $Ti$ have high responsibility. In addition, since there is little variation in the discharge temperature of the compressor 11 or the outside air temperature, it is possible to rapidly control the amount of refrigerant circulated in the cooling mode in the low outside air temperature environment.

In the above-described discharge temperature control method according to the related art, a theoretical discharge temperature is determined on the basis of an evaporation temperature of the evaporator, a condensation temperature of the condenser, and the degree of superheat. Therefore, the discharge temperature is calculated on the basis of these factors to control the opening degree of the expansion valve (see the right side of a Mollier diagram shown in FIG. 3).

Figure 3:
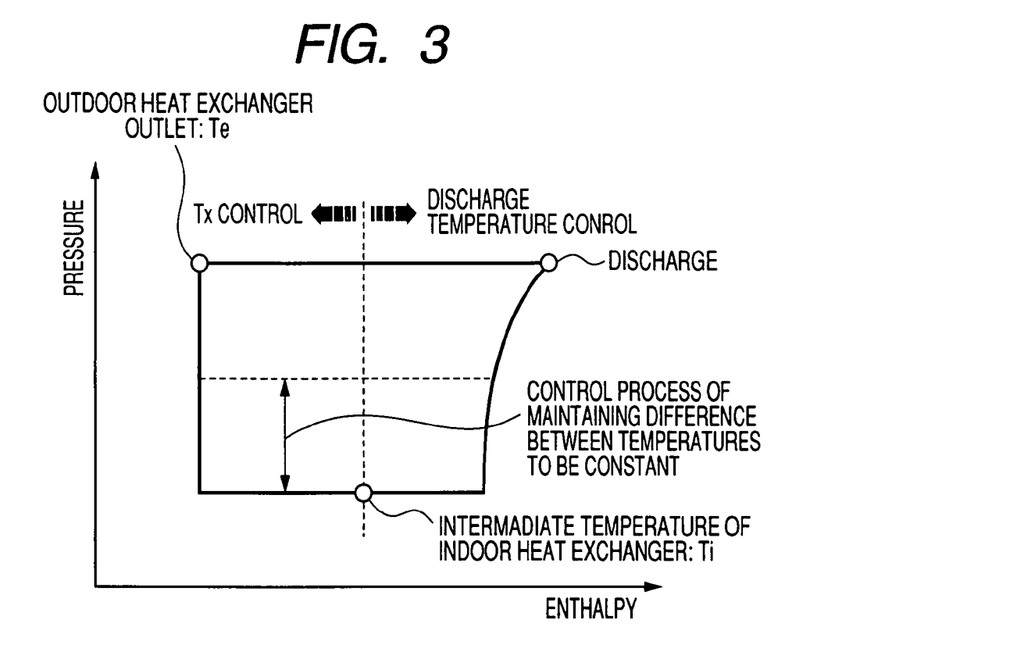
FIG. 3 is a Mollier diagram illustrating the comparison between a Tx control method according to the embodiment of the invention and a discharge temperature control method according to the related art.

In contrast, in the Tx control method according to this embodiment of the invention, as shown on the left side of the Mollier diagram shown in FIG. 3, the difference $Tx$ between the outlet temperature $Te$ of the outdoor heat exchanger 13 and the intermediate temperature $Ti$ of the indoor heat exchanger 15 is controlled to have a constant value.

That is, when the outside air temperature is dropped, the difference between the condensation temperature of the condenser and the evaporation temperature of the evaporator is reduced. Therefore, it is possible to ensure a minimum temperature difference. According to the embodiment of the invention, even when the room temperature and the outside air temperature vary, it is possible to ensure the optimum amount of refrigerant to be circulated by determining the target value $Txt$.

Next, the Tx control method according to this embodiment of the invention is compared with the discharge temperature control method according to the related art. In the discharge temperature control method according to the related art, in order to control the opening degree of the expansion valve, five variables, that is, a discharge temperature, the temperature of the indoor heat exchanger, the degree of superheat, the outside air temperature, and the number of rotations of the compressor, are needed. In addition, when the number of rotations of the outdoor fan decreases, the deviation between the actual outside air temperature and the detected outside air temperature occurs. Therefore, it is also necessary to correct the deviation between the temperatures. Further, the condensation temperature required to calculate a target discharge temperature is calculated on the basis of the evaporation temperature of the indoor heat exchanger, the number of rotations of the compressor, and the outside air temperature. In contrast, in the Tx control method according to this embodiment of the invention, only two variables, that is, the outlet temperature Te of the outdoor heat exchanger 13 and the intermediate temperature Ti of the indoor heat exchanger 15 are needed, which makes it possible to improve a response speed.

In the discharge temperature control method according to the related art, two variables, that is, the number of rotations of the compressor and the outside air temperature, are used to control the number of rotations of the outdoor fan. In the Tx control method according to this embodiment of the invention, two variables, that is, the outlet temperature Te of the outdoor heat exchanger 13 and the intermediate temperature Ti of the indoor heat exchanger 15 are used to control the number of rotations of the outdoor fan. That is, in both the discharge temperature control method and the Tx control method, two variables are used. However, in the discharge temperature control method according to the related art, when the number of rotations of the outdoor fan decreases, the deviation between the actual outside air temperature and the detected outside air temperature occurs, and thus it is necessary to correct the deviation between the temperatures. In contrast, in the Tx control method according to this embodiment of the invention, this correcting process is not needed, which makes it possible to improve a response speed.

In the Tx control method according to this embodiment of the invention, when the indoor heat exchanger 15 is superheated, the following relationships are established: Te<Ti and Tx<0. Therefore, particularly, even when a temperature sensor is not provided in the vicinity of the inlet of the indoor heat exchanger 15, it is possible to easily check whether the indoor heat exchanger 15 is in an superheating state.

Next, a method of determining the target value Txt for the Tx control will be described below.

(1) In the case of Tx<0, when the indoor heat exchanger 15 is superheated, Te is dropped to the outside air temperature (equal to or lower than the room temperature), but Ti rises to the room temperature. As a result, the following relationship is established: Tx=Te−Ti<0. In this case, it is determined that the indoor heat exchanger 15 is superheated, and the result of the Tx control is represented by NG.

Further, according to this embodiment of the invention, if Tx<0, it is possible to determine whether the indoor heat exchanger 15 is in the superheating state. Therefore, particularly, even when a temperature sensor is not provided in the vicinity of the inlet of the indoor heat exchanger 15, it is possible to easily check whether the indoor heat exchanger 15 is in the superheating state.

(2) In the case of Tx>>0, both the condensation temperature and the evaporation temperature rise, and cooling capability is considerably lowered, so that the result of the Tx control is represented by NG. Considering the cases (1) and (2), the target value Txt for the Tx control is set to a value around zero that is capable of ensuring cooling capability. Actually, the target value Txt is experimentally determined, but the invention is not limited thereto. The target value Txt may be fixed or variable according to a temperature zone of the outside air temperature.

Next, a control method of setting Tx to be approximately equal to Txt, preferably, equal to Txt (Tx−Txt=Ty=0) will be described below. In the cooling mode in a room temperature environment, the related art controls the electronic expansion valve 14 on the basis of the discharge temperature of the compressor, and when the outside air temperature falls, the Tx control is performed.

When the Tx control is performed due to the falling of the outside air temperature, the number of rotations of the outdoor fan 13a is decreased to be smaller than that in the cooling mode in the room temperature environment, and the number of rotations of the outdoor fan 13a is fixed to the reduced value. Then, the opening degree of the electronic expansion value 14 is controlled such that Ty is equal to zero. When the electronic expansion value is fully opened, but Ty does not reach zero, fan rotation number control is performed to adjust the number of rotations of the outdoor fan 13a such that Ty is equal to zero.

Figure 4:
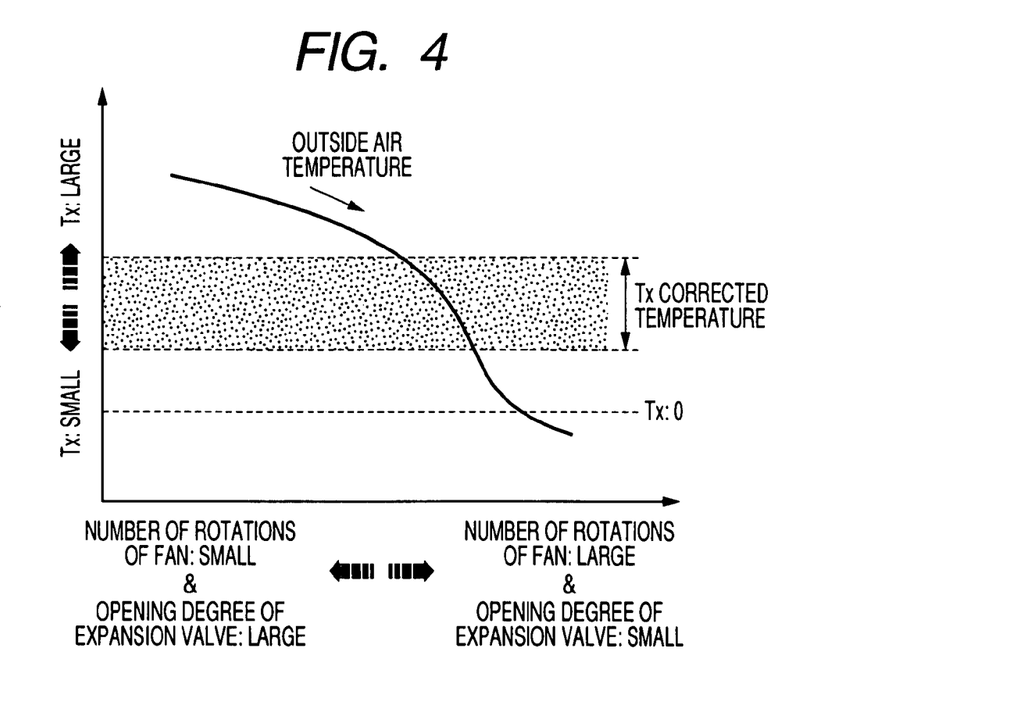
FIG. 4 is a graph illustrating the relationship among Tx, the opening degree of an expansion valve, and the number of rotations of an outdoor fan.

Tx varies in proportional to the outside air temperature, but it is possible to linearly control Tx, the opening angel of the expansion valve, and the number of rotations of the outdoor fan 13a. That is, as shown in FIG. 4, when the number of rotations of the outdoor fan increases and the opening degree of the expansion valve decreases, Tx becomes small. On the other hand, when the number of rotations of the outdoor fan decreases and the opening degree of the expansion valve increases, Tx becomes large.

Figure 5:
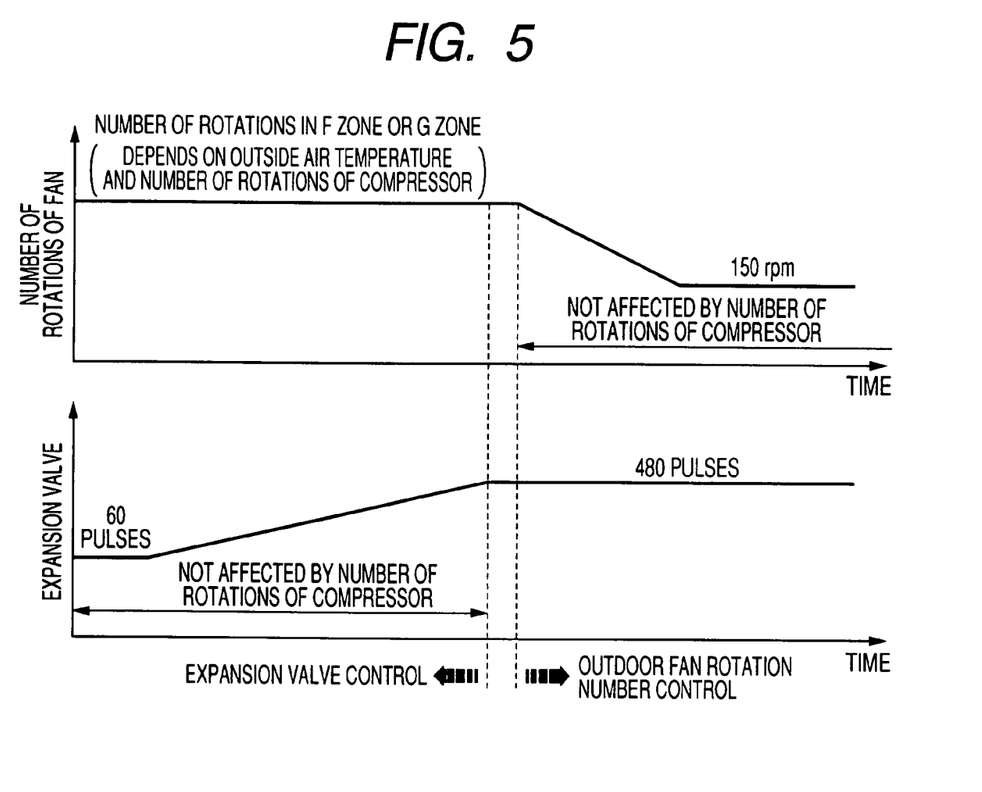
FIG. 5 is a timing chart illustrating an expansion valve control mode and an outdoor fan rotation number control mode included in the Tx control method according to the embodiment of the invention.
Figure 6:
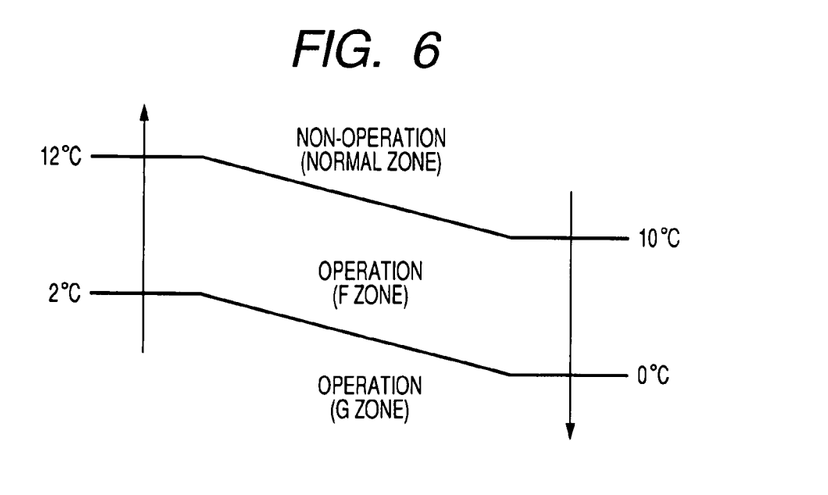
FIG. 6 is a diagram illustrating an example of a temperature zone of a low outside air temperature.

As described above, as shown in FIG. 5, the Tx control method according to this embodiment of the invention includes an expansion valve control mode and an outdoor fan rotation number control mode. FIG. 6 shows an example of the temperature zone, which is an operational condition of the Tx control method.

In FIG. 6, an upward arrow indicates the rising of the outside air temperature, and a downward arrow indicates the falling of the outside air temperature. In this embodiment, when the outside air temperature rises, a temperature range that is equal to or lower than 12° C. (when the outside air temperature falls, a temperature range that is equal to or lower than 10° C.) is a Tx control operation zone in which the Tx control is performed in the low outside air temperature environment. The Tx control operation zone includes an F zone, which is a range of 2 to 12° C. when the outside air temperature rises (a range of 0 to 10° C. when the outside air temperature falls), and a G zone, which is a range that is equal to or lower than 2° C. when the outside air temperature rises (a range that is equal to or lower than 0° C. when the outside air temperature falls). In this case, characters 'F' and 'G' in the F zone and the G zone do not have specific meaning.

When the outside air temperature rises to be higher than 12° C. (when the outside air temperature falls to be lower than 10° C.), a compressor discharge temperature control process according to the related art is performed. In addition, the outside air temperature is detected by the outside air temperature sensor 134a shown in FIG. 2. Actually, a process of determining a zone is performed on the basis of a temperature obtained by adding a predetermined correction value to the detected outside air temperature. Further, different threshold temperatures are set during the rising of the outside air temperature and during the falling of the outside air temperature in order to prevent chattering.

The opening degree of the electronic expansion valve 14 is controlled by the number of pulses applied to a pulse motor (not shown). In this embodiment, when the number of pulses is 60, which is a minimum number, the electronic expansion valve 14 is fully closed. When the number of pulses 480, which is a maximum number, the electronic expansion valve 14 is fully opened.

Table 1 shows the number of rotations (rpm) of the outdoor fan 13a in the F zone and the G zone in this embodiment. The number of rotations of the outdoor fan 13a varies according to the number of rotations of the compressor 11. For example, when the number of rotations of the compressor 11 is equal to or larger than 54 rps, Hi1 is selected. When the number of rotations of the compressor 11 is equal to or larger than 42 rps, Me1 is selected. When the number of rotations of the compressor 11 is smaller than 42 rps, Lo1 is selected. The minimum number of rotations of the outdoor fan 13a is 150 in both the F zone and the G zone.

TABLE 1

|  |  | F zone | G zone |
|---|---|---|---|
| Maximum | Hi1 | 400 | 280 |
|  | Me1 | 340 | 250 |
|  | Lo1 | 280 | 230 |
| Minimum |  | 150 | 150 |

Table 2 shows the relationship among an added pulse, an added outdoor fan rotation number, and a control time interval according to the target value Txt and the difference Ty between Tx and Txt in the F zone and the G zone. As can be seen from Table 2, the target value Txt is calculated by an expression (0.5×Ta'+7) in the F zone, and the target value Txt is fixed to 5 in the G zone. Here, Ta' indicates a corrected outside air temperature. In addition, a lower limit value of Tx (=Te−Ti) is 7, and an upper limit value thereof is 13.

TABLE 2

| Target value Txt | | Added pulse | Added outdoor fan rotation number | Control time interval |
|---|---|---|---|---|
| F zone 0.5 × Ta' + 7 | G zone 5 | | | |
| 10 ≦ Ty | | −20 | +40 | 120 sec |
| 5 ≦ Ty < 10 | | −10 | +20 | |
| 2 ≦ Ty < 5 | | −5 | +10 | |
| 1 ≦ Ty < 2 | | −1 | +5 | |
| −1 ≦ Ty < 1 | | 0 | 0 | |
| −2 ≦ Ty < −1 | | +1 | −5 | |
| −5 ≦ Ty < −2 | | +5 | −10 | |
| −10 ≦ Ty < −5 | | +20 | −20 | |
| −25 ≦ Ty < −10 | | +80 | −20 | |
| Ty < −25 | | +150 | −80 | 30 sec |
| Ty ≦ −70 | | | | |

Figure 7:
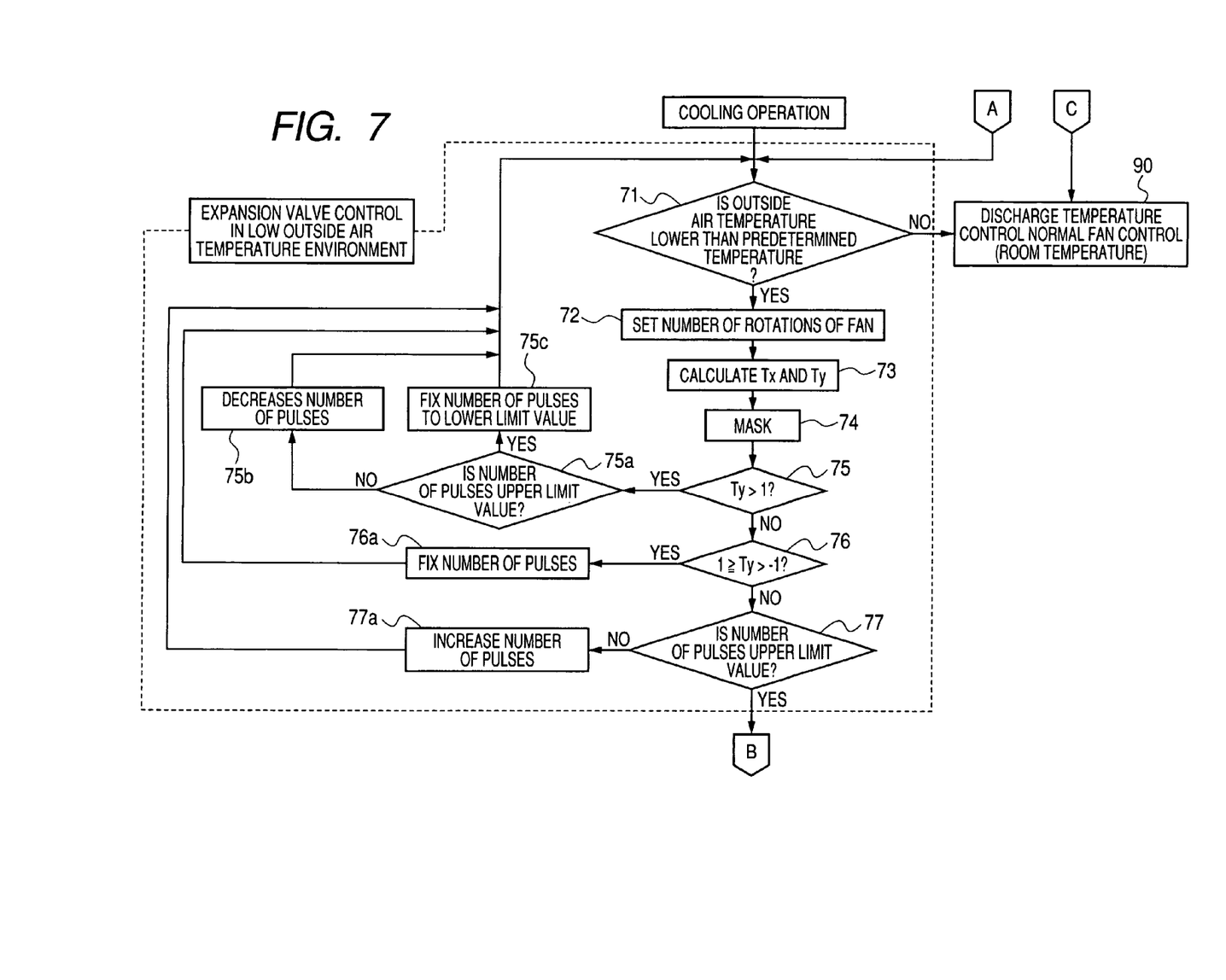
FIG. 7 is an operational flowchart illustrating the expansion valve control mode.
Figure 8:
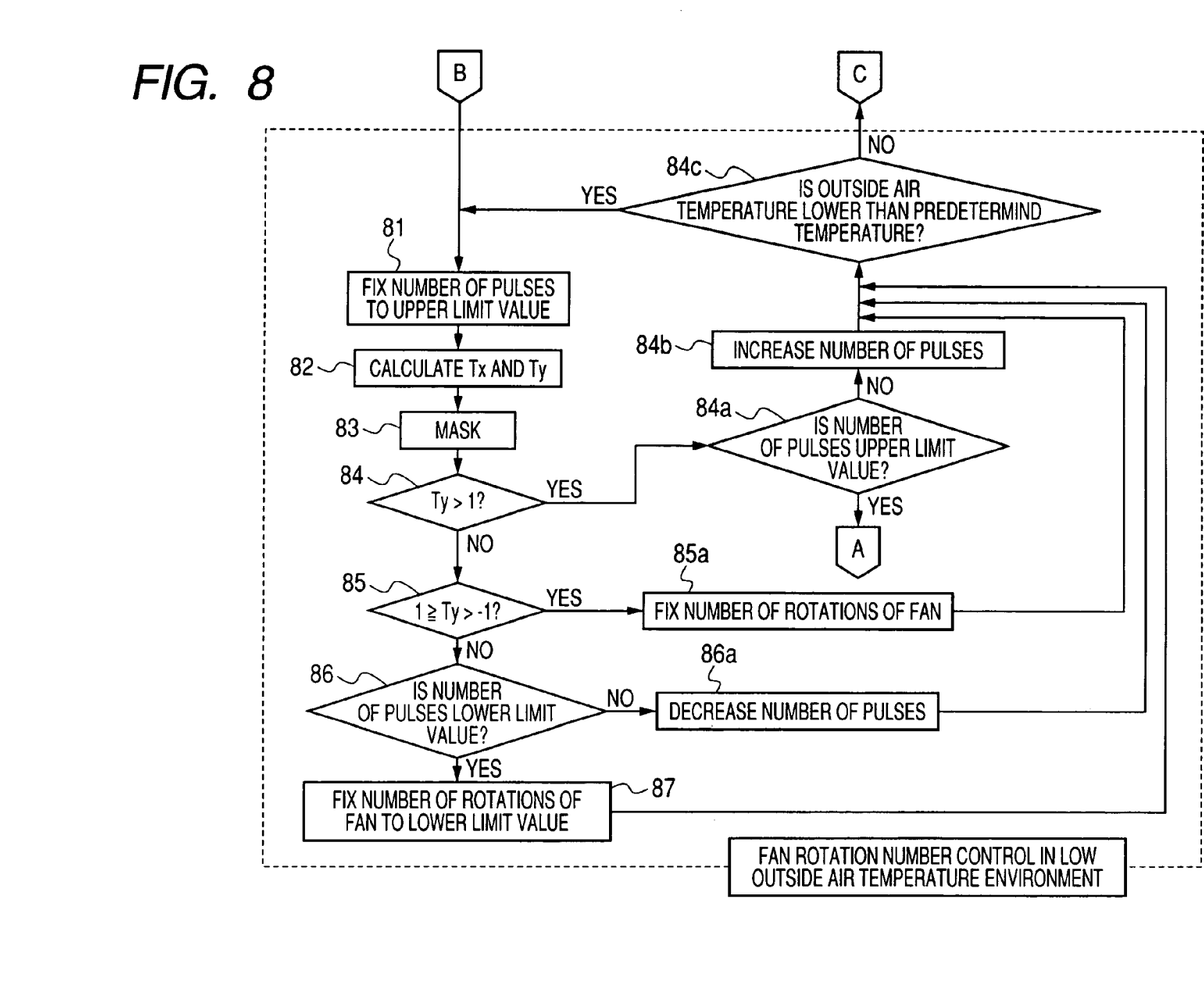
FIG. 8 is an operational flowchart illustrating the outdoor fan rotation number control mode.

Next, an example of the Tx control method according to the embodiment of the invention will be described with reference to flowcharts shown in FIGS. 7 and 8. FIG. 7 is a flowchart illustrating the expansion valve control mode, and FIG. 8 is a flowchart illustrating the outdoor fan rotation number control mode.

In the cooling operation, the Tx control starts from the expansion valve control mode shown in FIG. 7. First, in Step 71, the outside air temperature determining unit 155 of the indoor unit controller 150 determines whether the outside air temperature is lower than a predetermined value. When the outside air temperature is within the F zone or the G zone, the process proceeds to Step 72. On the other hand, when the outside air temperature is higher than the predetermined value (when the outside air temperature is higher than 12° C. during the rising of the outside air temperature (10° C. during the falling of the outside air temperature)), the process proceeds to Step 90, and a general compressor discharge temperature control process (in a room temperature environment) is performed.

In Step 72, the number of rotations of the outdoor fan 13a decreases. For example, in the case of the F zone, the number of rotations of the outdoor fan 13a is set to 50% of the number of rotations of the output door fan 13a in a normal mode. In the case of the G zone, the number of rotations of the outdoor fan 13a is set to 30% of the number of rotations of the output door fan 13a in the normal mode. Then, the set number of rotations of the outdoor fan 13a is maintained.

Next, in Step 73, Tx and Ty are calculated. Tx, which is the difference between the outlet temperature Te of the outdoor heat exchanger 13 and the intermediate temperature Ti of the indoor heat exchanger 15 (Te−Ti), is calculated, and Ty, which is the difference between the calculated value Tx and the target value Txt (Tx−Txt), is calculated. This calculating process is performed by a Tx and Ty calculating unit 137 of the outdoor unit controller 130.

After Tx and Ty are calculated, masking is performed for a predetermined time in Step 74, and then the process proceeds to Step 75. The mask time corresponds to the control time interval shown in Table 2.

In Step 75, it is determined whether Ty>1. When it is determined that Ty is equal to or smaller than 1, the process proceeds to Step 76 to determine whether 1≧Ty>−1. On the other hand, when it is determined that Ty>1, it is determined in Step 75a whether a pulse has a lower limit value.

In this case, the pulse means a control pulse applied from the electronic expansion valve control unit 136 of the outdoor unit controller 130 to a pulse motor (not shown) for driving the electronic expansion valve 14, and the lower limit value of the pulse is 60, as described above.

When the pulse does not reach the lower limit value, in order to decrease the value of Tx with respect to the target value Txt, the number of pulses is decreased by a predetermined value in Step 75b such that the opening degree of the electronic expansion valve is reduced, and then the process proceeds to Step 71. As shown in Table 2, the number of pulses reduced depends on the value of Ty.

When the outside air temperature is lower than a predetermined value, the number of pulses is less likely to reach the lower limit value. However, when the number of pulses reaches the lower limit value, the number of pulses is fixed to the lower limit value in Step 75c, and then process proceeds to Step 71.

This routine is repeatedly performed. That is, it is determined in Step 75 whether Ty>1. When the result of the determination is NO, that is, Ty is equal to or smaller than 1, it is determined in Step 76 whether 1≧Ty>−1. When the result of the determination is YES, that is, the relationship 1≧Ty>−1 is established, it is determined that an appropriate amount of refrigerant circulated is obtained. Then, the number of pulses is fixed in Step 76a, and the process returns to Step 71.

When the result of the determination in Step 76 is NO, Ty is equal to or smaller than −1. Therefore, in the next Step 77, it is determined whether the number of pulses reaches the upper limit value, that is, 480.

When the number of pulses does not reach the upper limit value, in order to increase the value of Tx with respect to the target value Txt, the number of pulses is increased by a predetermined value in Step 77a such that the opening degree of the electronic expansion value 14 increases, and then the process proceeds to Step 71. In this procedure, when the relationship 1≧Ty>−1 is established, the number of pulses is fixed in Step 76*a*. As shown in Table 2, the number of pulses added depends on the value of Ty.

As described above, in the expansion valve control mode, the opening degree of the electronic expansion valve 14 is adjusted, with the number of rotations of the outdoor fan 13*a* being decreased, such that the difference Ty between the value Tx and the target value Txt satisfies $1 \geq Ty > -1$. However, when the difference Ty does not satisfy the relationship $1 \geq Ty > -1$, the expansion valve control mode is switched to an outdoor fan rotation number control mode shown in FIG. 8 after a predetermined time has elapsed.

In the outdoor fan rotation number control mode, the number of pulses is fixed to an upper limit value (the electronic expansion value 14 is fully opened) in Step 81, and the values Tx and Ty are calculated again in Step 82. Then, masking is performed for a predetermined time in Step 83, and it is determined in Step 84 whether Ty is larger than 1. This is because Ty may be larger than 1 due to a variation in the outside air temperature.

When Ty is equal to or smaller than 1 and the relationship $1 \geq Ty > -1$ is not established in the next Step 85, it is determined in Step 86 whether the number of rotations of the outdoor fan 13*a* is a lower limit value (150 rpm) When the number of rotations of the outdoor fan 13*a* is not the lower limit value, in order to increase the value of Tx with respect to the target value Txt, the number of rotations of the outdoor fan 13*a* is decreased by a predetermined value in Step 86*a*, and then the process returns to Step 81 through Step 84*c* (in which it is determined whether the outside air temperature is lower than a predetermined value). As shown in Table 2, the decrease value of the number of rotations of the outdoor fan 13*a* depends on the value of Ty.

As shown in Step 87, the number of rotations of the outdoor fan 13*a* is reduced to the lower limit value, that is, 150 rpm. However, in the routine for reducing the number of rotations of the outdoor fan 13*a*, when $1 \geq Ty > -1$ is satisfied, it is determined that an appropriate amount of refrigerant circulated is obtained, and the number of rotations of the outdoor fan 13*a* is fixed in Step 85*a*. Then, the process returns to Step 81 through Step 84*c* (in which it is determined whether the outside air temperature is lower than a predetermined value).

When it is determined in Step 84 that Ty>1, it is determined in Step 84*a* whether the number of rotations of the outdoor fan 13*a* is an upper limit value. As the result of the determination, when the number of rotations of the outdoor fan 13*a* is not the upper limit value, in order to decrease the value of Tx with respect to the target value Txt, the number of rotations of the outdoor fan 13*a* is increased by a predetermined value in Step 84*b*, and then the process returns to Step 81 through Step 84*c* (in which it is determined whether the outside air temperature is lower than a predetermined value).

When it is determined in Step 84*c* that the outside air temperature is not lower than the predetermined value, the control mode is switched from the Tx control mode to the compressor discharge temperature control mode that is performed under a normal condition (at the room temperature) in Step 90. In addition, when it is determined in Step 84*a* that the number of rotations of the outdoor fan 13*a* reaches the upper limit value, the process returns to Step 71 of the expansion valve control mode.

What is claimed is:

1. A method of controlling an air conditioner having a refrigerating cycle including a compressor, an outdoor heat exchanger, an expansion valve, and an indoor heat exchanger, the method comprising:

controlling an opening degree of the expansion valve and/or the number of rotations of an outdoor fan of the outdoor heat exchanger to maintain a difference Tx (=Te−Ti) between the temperature Te of the outdoor heat exchanger and the temperature Ti of the indoor heat exchanger within a predetermined range, in a cooling mode in a low outside air temperature environment, wherein the temperature Te of the outdoor heat exchanger is the temperature of an outlet of the outdoor heat exchanger, and the temperature Ti of the indoor heat exchanger is detected at the center of a pipeline passing through the indoor heat exchanger.

2. The method of controlling an air conditioner according to claim 1, wherein when the difference Tx is larger than an upper limit value of the predetermined range, the opening degree of the expansion valve is reduced and/or the number of rotations of the outdoor fan is increased to return the difference Tx to within the predetermined range.

3. The method of controlling an air conditioner according to claim 1, wherein when the difference Tx is smaller than a lower limit value of the predetermined range, the opening degree of the expansion valve is increased and/or the number of rotations of the outdoor fan is decreased to return the difference Tx to within the predetermined range.

4. The method of controlling an air conditioner according to claim 1, wherein the opening degree of the expansion valve and/or the number of rotations of the outdoor fan vary according to an outside air temperature.

5. A method of controlling an air conditioner having a refrigerating cycle including a compressor, an outdoor heat exchanger, an expansion valve, and an indoor heat exchanger, the method comprising:

controlling an opening degree of the expansion valve and/or the number of rotations of an outdoor fan of the outdoor heat exchanger to maintain a difference Tx (=Te−Ti) between the temperature Te of the outdoor heat exchanger and the temperature Ti of the indoor heat exchanger within a predetermined range, in a cooling mode in a low outside air temperature environment, wherein an expansion valve control mode for controlling the opening degree of the expansion valve is performed prior to a mode for controlling the number of rotations of the outdoor fan, in order to set the difference Tx within the predetermine range.

6. The method of controlling an air conditioner according to claim 5, wherein in the expansion valve control mode, the number of rotations of the outdoor fan is set to be smaller than that of the outdoor fan in a normal cooling mode.

7. The method of controlling an air conditioner according to claim 5, wherein when the difference Tx is beyond the predetermined range, the expansion valve control mode is switched to the mode for controlling the number of rotations of the outdoor fan to decrease the number of rotations of the outdoor fan to a predetermined number of rotations.

* * * * *